United States Patent
Wansink

(10) Patent No.: US 8,961,142 B2
(45) Date of Patent: Feb. 24, 2015

(54) PROTECTED WIND TURBINE BLADE, A METHOD OF MANUFACTURING IT AND A WIND TURBINE

(75) Inventor: Gerrit Jan Wansink, Neede (NL)

(73) Assignee: XEMC Darwind B.V., Hilversum (NL)

( * ) Notice: Subject to any disclaimer, the term of this patent is extended or adjusted under 35 U.S.C. 154(b) by 562 days.

(21) Appl. No.: 13/263,783

(22) PCT Filed: Apr. 9, 2010

(86) PCT No.: PCT/NL2010/000064
§ 371 (c)(1),
(2), (4) Date: Oct. 10, 2011

(87) PCT Pub. No.: WO2010/117262
PCT Pub. Date: Oct. 14, 2010

(65) Prior Publication Data
US 2012/0034094 A1    Feb. 9, 2012

(30) Foreign Application Priority Data

Apr. 10, 2009   (NL) ...................................... 1036846
May 19, 2009   (NL) ...................................... 1036968

(51) Int. Cl.
*F03D 1/06* (2006.01)
*B29D 99/00* (2010.01)
*B29L 31/08* (2006.01)

(52) U.S. Cl.
CPC ..... *B29D 99/0025* (2013.01); *F05B 2280/6003* (2013.01); *Y02E 10/721* (2013.01);
(Continued)

(58) Field of Classification Search
CPC .................... F05B 2280/6003; F05C 2253/04; F03D 1/0675; B29D 99/0025; B29K 2995/0087; B29L 2031/08; Y02E 10/721
USPC .............. 416/224, 229 R, 230, 241 A, 241 R; 29/889.21
See application file for complete search history.

(56) References Cited

U.S. PATENT DOCUMENTS 3,237,697 A     3/1966   Ford
4,892,462 A *   1/1990   Barbier et al. ................ 416/226
(Continued)

FOREIGN PATENT DOCUMENTS

EP              2018088 A      1/2009
WO              WO 96/01288 A  1/1996
(Continued)

OTHER PUBLICATIONS

Accudynetest, Critical Surface tension, surface free energy, Contact angles with water, and Hansen solubility parameters for various polymers, 2009, Diversified Enterprises,Polytable 01.*

(Continued)

*Primary Examiner* — Liam McDowell
(74) *Attorney, Agent, or Firm* — Steven M. Koehler; Westman, Champlin & Koehler, P.A.

(57) ABSTRACT

A protected turbine blade includes a first turbine blade shell and a second turbine blade shell, being fiber-reinforced, are connected by a cured resin and provided with a protective cover at a leading edge. The protective cover is a composite comprising a layer of UV-resistant thermoplastic material and a layer of cured epoxy resin, the UV-resistant thermoplastic material having the following properties a surface free energy of less than 35 mJ/m$^2$, and a erosion resistance of the thermoplastic material larger than the erosion resistance of the cured resin connecting the turbine blade shells. The layer of cured epoxy-resin covers the cured resin over at least part of the length of the distal half of the turbine blade, and is bonded to said turbine blade. A method of manufacturing such a turbine blade, and to a turbine having such turbine blades is also provided.

10 Claims, 2 Drawing Sheets

(52) U.S. Cl.
CPC ..... *B29K2995/0087* (2013.01); *B29L 2031/08* (2013.01); *F03D 1/0675* (2013.01); *F05C 2253/04* (2013.01)
USPC ............... 416/224; 416/229 R; 416/241 A

(56) References Cited

U.S. PATENT DOCUMENTS

| | | | |
|---|---|---|---|
| 6,264,877 B1* | 7/2001 | Pallu De La Barriere | 264/516 |
| 7,980,840 B2* | 7/2011 | Burchardt et al. | 425/129.1 |
| 2004/0118978 A1 | 6/2004 | Anning | |
| 2007/0036659 A1* | 2/2007 | Hibbard | 416/233 |
| 2008/0075603 A1* | 3/2008 | Van Breugel et al. | 416/232 |
| 2008/0107540 A1 | 5/2008 | Bonnet | |
| 2008/0181775 A1 | 7/2008 | Livingston | |
| 2008/0304971 A1 | 12/2008 | Liebmann | |
| 2009/0057297 A1 | 3/2009 | Boschet | |
| 2009/0101759 A1 | 4/2009 | West | |
| 2009/0246033 A1* | 10/2009 | Rudling | 416/241 A |

FOREIGN PATENT DOCUMENTS

| | | |
|---|---|---|
| WO | 03078833 | 9/2003 |
| WO | 2004076852 | 9/2004 |
| WO | WO 2006066593 A | 6/2006 |

OTHER PUBLICATIONS

Official Search Report and Written Opinion of the European Patent Office in counterpart foreign application No. PCT/NL2010/000064 filed Apr. 9, 2010.

Official Search of the European Patent Office in counterpart foreign priority application No. NL1036968 filed May 19, 2009.

Reply to Notice of Opposition filed by the European Patent Office on Oct. 12, 2014 in regard to foreign application EP10713260.7, filed Feb. 15, 2012.

Windkraftanlagen, Erich Hau, 2000, pp. 198-199.

Henkel, Key Factors of the Peel Ply Surface Preparation Process, David Klapprott, et al., 1996.

Inspicos, Statement of facts and arguments accompanying the Notice of Opposition regarding EP Patent No. 2 416 950 B1, dated Jun. 25, 2014.

* cited by examiner

US 8,961,142 B2

PROTECTED WIND TURBINE BLADE, A METHOD OF MANUFACTURING IT AND A WIND TURBINE

CROSS-REFERENCE TO RELATED APPLICATION

This Application is a Section 371 National Stage Application of International Application No. PCT/NL2010/000064, filed Apr. 9, 2010 and published as WO 2010/117262 A1 on Oct. 14, 2010, in English.

BACKGROUND

The discussion below is merely provided for general background information and is not intended to be used as an aid in determining the scope of the claimed subject matter.

Aspects of the invention relate to a protected turbine blade, comprising a first turbine blade shell and a second turbine blade shell, said turbine blade shells being fibre-reinforced turbine blade shells connected by cured resin and provided with a protective cover at the leading edge of the turbine blade for protecting the cured resin at the leading edge of the turbine blade against erosion.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is to provide a wind turbine blade that maintains good aerodynamic properties without heating element or—if a heating element is present—in case of failure of the heating element.

To this end, the wind turbine blade includes a protective cover that is a composite comprising a layer of UV-resistant thermoplastic material and a layer of cured epoxy resin, the UV-resistant thermoplastic material having the following properties:
 a surface free energy of less than 35 mJ/m$^2$, and
 an erosion resistance larger than the erosion resistance of the cured resin connecting the turbine blade shells,
wherein the layer of cured epoxy-resin covers the cured resin used for connecting the first and second blade shells over at least part of the length of the distal half of the turbine blade, and is bonded to said turbine blade.

The nature of the layer of thermoplastic material decreases the chance of build up of ice on its surface as a result of which the aerodynamic shape of the turbine blade is maintained and unbalance of the wind turbine due to ice is prevented and protects the cured resin connecting the blade shells. The term "UV-resistant" means both inherent resistance to UV or resistance acquired by the presence of additives for stabilizing against UV. The thermoplastic material is preferably at least 5 times as resistant to erosion as the cured resin for connecting the blade shells. Erosion resistance will be measured using the method described in the example section, using artificial rain. The thickness of the layer of thermoplastic material is generally in the range of 0.2 to 10 mm, preferably 0.3 to 3 mm, more preferably 0.5 to 1 mm. The distal half of a turbine blade is the half away from the root and comprising the tip of the turbine blade. When reference is made to the layer of cured epoxy-resin being bonded to said turbine blade, this means that this layer of cured epoxy-resin faces the turbine blade shells and is bonded to said turbine blade shells, generally with epoxy-resin as will be detailed in the example below. According to one embodiment, the UV-resistant thermoplastic material comprises UV-stabilized polyolefin.

This material displays good qualities with respect to both erosion resistance and surface free energy. Linear polyolefins are preferred, because of their higher density and erosion resistance.

According to another embodiment, the polyolefin is ultrahigh molecular weight polyethylene and more preferably ultrahigh molecular weight polypropylene, copolymers of polyethylene and polypropylene, or blends comprising polyethylene and polypropylene.

In particular polypropylene displays good erosion resistance and a low surface free energy. It is also already more UV resistant by nature. The copolymers and blends are also preferably ultrahigh molecular weight.

According to another embodiment, the layer of cured epoxy-resin is a layer of fiber-reinforced cured epoxy-resin, the fibers being partially embedded in the cured epoxy-resin and partially embedded in the remainder of the protective cover.

Such a protective cover is very strong. For optimum strength, it is preferred that the fibers are part of a fabric comprised of bundles of fibers.

An aspect of the invention also relates to a method for manufacturing a wind turbine blade, wherein
 a UV resistant thermoplastic material is heated in a mold until it softens,
 one side of a fabric comprised of bundles of fibers placed on top of one side of the thermoplastic material is immersed in said softened thermoplastic material,
 the thermoplastic material provided with the fabric comprised of bundles of fibers is cooled down;
 the second side of the fabric of the thermoplastic material provided with the fabric comprised of bundles of fibers is immersed in curable resin, and the curable resin is cured to yield a layer of cured epoxy resin,
to yield a shaped cover of composite material, after which
 curable resin is applied to at least one of i) at least part of the length of the distal half of the turbine blade, and ii) the side of the shaped cover comprising cured epoxy resin;
 the shaped cover is placed over at least part of the length of the distal half of the leading edge of a turbine blade assembly composed of two turbine blade shells connected by cured resin, such that over at least part of the length of the distal half of the turbine blade said cured resin is covered by the shaped cover, and
 the shaped cover is bonded to said turbine blade assembly by curing the curable resin;
to yield the protected turbine blade.

Thanks to the use of a mold, the shape of the protected turbine blade can be controlled very well, making it aerodynamically more suitable and hence less subject to erosion. The fiber mat is, for example, embedded with said one side thereof in the thermoplastic material by pressing it into the thermoplastic material using a closed mold. In the context of softened thermoplastic resin, the terms embedded and immersed are meant to be completely interchangeable. The layer of cured epoxy-resin faces the turbine blade shells and the UV resistant thermoplastic material now forms the leading edge and is subjected to the environment (atmosphere).

According to one embodiment, when curing the curable resin to yield the layer of cured epoxy resin of the shaped cover, at the side of curable resin opposite to the side that contains immersed bundles of fibers of the fabric a textured peel ply is present to provide a rough surface of increased surface area to increase the bond strength between the shaped cover and the turbine blade.

Finally, an aspect of the invention relates to a wind turbine comprising at least one turbine blade having one or more features herein described or manufactured using the method having one or more steps herein described.

BRIEF DESCRIPTION OF THE DRAWINGS

Aspects of the present invention will now be illustrated with reference to the drawing where.

DETAILED DESCRIPTION OF THE ILLUSTRATIVE EMBODIMENTS

Figure 1:
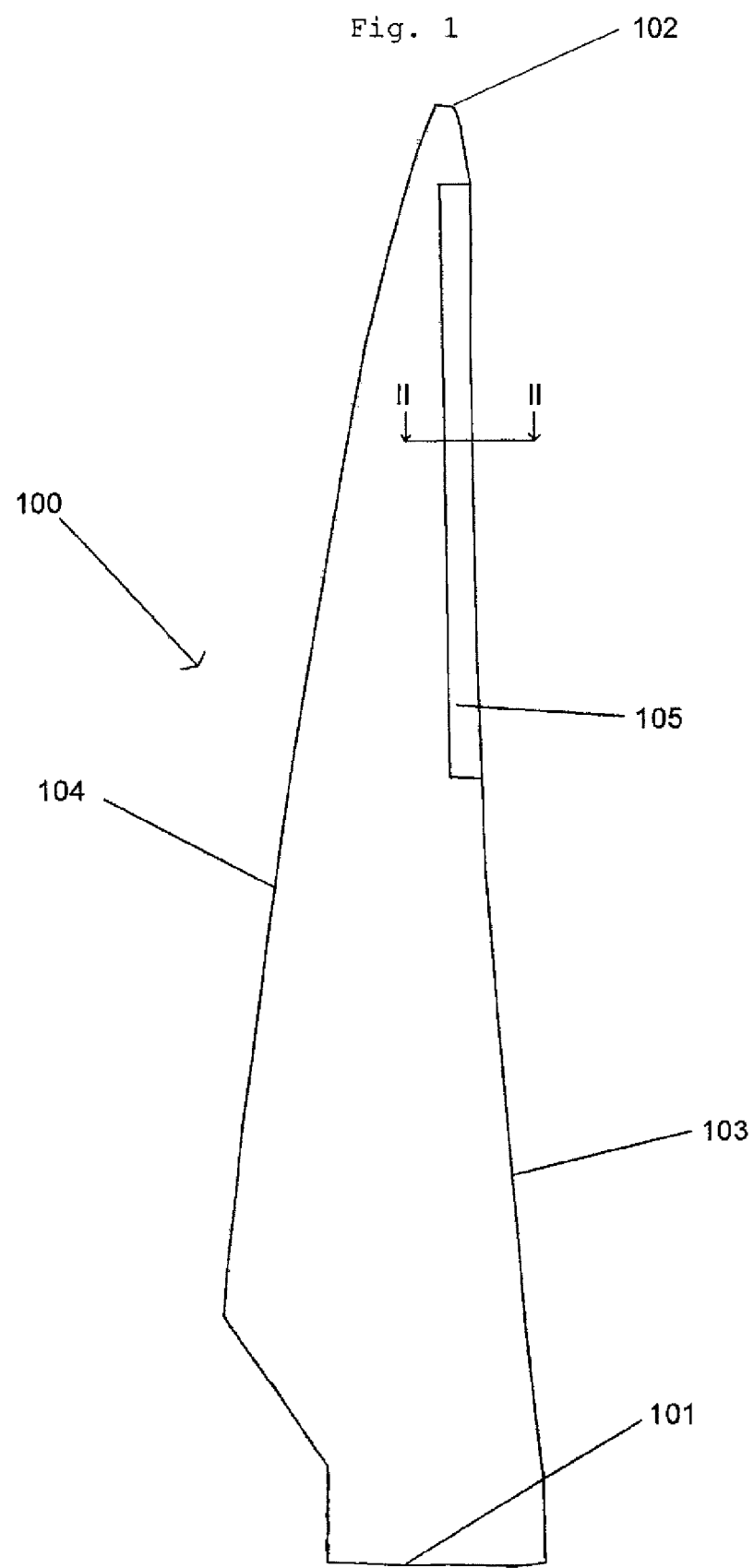
FIG. 1 shows a turbine blade provided with a protective cover at its leading edge.

FIG. 1 shows a turbine blade 100 with a root 101, a tip 102, a leading edge 103 and a trailing edge 104. At the leading edge 103, it is provided with a protective cover 105.

Figure 2:
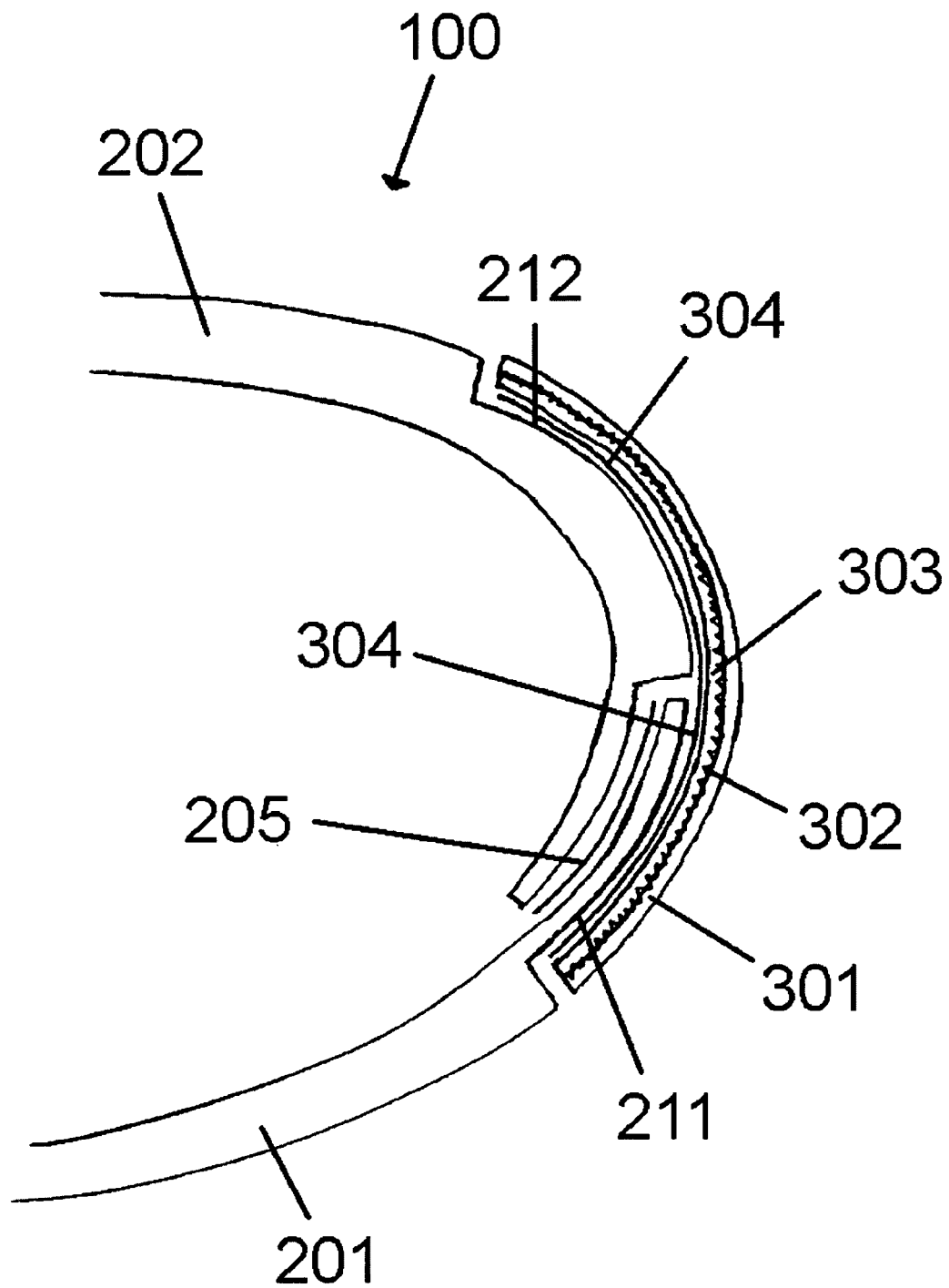
FIG. 2 shows a schematic cross-sectional view through the turbine blade of FIG. 1 along line II-II.

FIG. 2 shows a cross-sectional view along line II-II of FIG. 1, showing that the turbine blade 100 comprises a first turbine shell 201 and a second turbine shell 202. The first turbine shell 201 and the second turbine shell 202 are connected with a cured resin 205. The turbine shells 201 and 202 have recessed areas 211, 212 such that the protective cover 105 joins seamlessly, and the outer surface of the protective cover 105 and the turbine blade shells 201, 202 define the aerodynamic profile of the turbine blade 100.

The protective cover 105 protects the leading edge 103 of the turbine blade 100, and in particular the cured resin 205. The protective cover 105 comprises a high molecular weight polyethylene (HMWPE) layer 301 (thickness 0.5 mm), a commercially available glass-fiber mat 302 (800 gsm bi-axial +/−45° non crimp fabric) partially embedded in said HMWPE layer 301 by heating the HMWPE layer 301 in a mold, e.g. a vacuum mold. Protruding fibers of the glass-fiber mat 302 are impregnated with epoxy-resin and subsequently cured to yield a cured epoxy-resin layer 303. The total thickness of the protective cover 105 is 2.5 mm. The epoxy-resin 303 is generally of the same type as used for the manufacture of the blade shells 201, 202, and in particular a resin conventionally used for the manufacture of wind turbine blades using Resin Injection Molding (RIM). A typical resin for RIM is epoxy resin that is cured using heat, for example at 75° C. To improve the strength with which the protective cover 105 is attached to the turbine shells 201, 202, the uncured epoxy-resin to form layer 303 is advantageously covered with a nylon ply sheet, as is known in itself. This ply sheet is removed just before the protective cover 105 is attached to the unit consisting of blade shells 201, 202 connected to each other using cured resin. Bonding the protective cover 105 to the unit is achieved using the heat-curable epoxy-resin 304, which again is preferably the same as the epoxy-resin used for layer 303.

Erosion Measurements

A method for testing the erosion resistance of materials is known for testing aircraft wings or missiles. It is called the rain erosion test and was used to determine the erosion resistance of the protective cover used for a blade.

The erosion resistance is measured in a chamber by subjecting a sample to artificial rain (the raindrops having a diameter of 2 mm). The sample is rotated around a vertical axis, and the sample moves with a speed of 136.6 m/s. The amount of artificial rain is 25 l/hr per square meter, and it falls from a height of 30 cm above the sample. Further conditions in the chamber are:

Relative humidity >99%.

Temperature (varies during test due to evolving heat): 18.8°-27.1°.

The sample is rotated at a distance of 1 m from the central axis of rotation and has the following dimensions: 6 cm wide, parabolic to simulate a leading edge, frontal height 20 mm. The sample is inspected visually with a microscope at specified intervals with respect to erosion. Two measures are used:

time without damage; and weight loss per time unit.

The initial weight was 42.8878 g. After 270 minutes, the weight was 42.8846, a loss of weight of only 0.0032 g, which is very satisfactory. Visual inspection showed increased roughening of the surface in time but no chipping. After 270 minutes, the roughening was still very minor.

Ice Experiments

To study the behavior in case of icing, the following experiment was conducted. A tray with water was frozen to −24° C. in a freezer. The upper surface the ice was melted and a plate of polyethylene (60×80 mm) with a surface free energy of less than 35 mJ/m$^2$ was placed in the layer of water on top of the remaining ice. The tray was placed in the freezer again. The force (in a direction perpendicular to the ice surface) required to remove the plate from the tray was 30 N. In similar experiment the plate was bent slightly and force to dislodge the ice the force was significantly less. In both cases the plate separated from the ice cleanly, that is without ice remaining on the surface.

A second experiment involved placing a drop of ice water onto the plate of polyethylene taken from the freezer. The drop freezes and is quite easy to remove by bending of the plate.

These experiments provide a good indicator that under practical circumstances, i.e. on top of a rotating blade, the conditions are such that any ice that might form on the protective cover will easily dislodge. Variations in wind speed, be it because the wind speed varies, the blade passes the tower or due to difference in wind speeds at various heights, cause the blade to flex, dislodging the ice. If desired, the pitch of the blades could be changed to affect the curvature of the blades.

The invention claimed is:

1. A protected turbine blade, comprising a first turbine blade shell and a second turbine blade shell, said first turbine blade and said second turbine blade shell being fiber-reinforced turbine blade shells connected by cured resin and provided with a protective cover at a leading edge of the turbine blade for protecting the cured resin at the leading edge of the turbine blade against erosion, wherein the protective cover is a composite comprising a layer of UV-resistant thermoplastic material and a layer of cured epoxy resin, each of the layer of UV-resistant thermoplastic material and a cured epoxy resin forming a connection with fibers of the fiber-reinforced turbine blade shells, the UV-resistant thermoplastic material having the following properties a surface free energy of less than 35 mJ/m$^2$, and an erosion resistance larger than an erosion resistance of the cured resin connecting the turbine blade shells, wherein the layer of cured epoxy resin covers the cured resin used for connecting the first and second blade shells over at least part of a length of a distal half of the turbine blade, and is bonded to said turbine blade.

2. The protected turbine blade according to claim 1, wherein the UV-resistant thermoplastic material is UV-stabilized polyolefin.

3. The protected turbine blade according to claim 2, wherein the polyolefin is ultrahigh molecular weight polyethylene, ultrahigh molecular weight polypropylene or copolymers of polyethylene and polypropylene, or blends comprising polyethylene and polypropylene.

4. The protected turbine blade according to claim 1, wherein the layer of cured epoxy resin is a layer of fiber-reinforced cured epoxy resin, the fibers being partially embedded in the cured epoxy resin and partially embedded in a remainder of the composite.

5. A method for manufacturing a protected turbine blade having a first turbine blade shell and a second turbine blade shell, said first turbine blade shell and said second turbine blade shell being fiber-reinforced turbine blade shells connected by cured resin and provided with a protective cover at a leading edge of the turbine blade for protecting the cured resin at the leading edge of the turbine blade against erosion, wherein the protective cover is a composite comprising a layer of UV-resistant thermoplastic material and a layer of cured epoxy resin, the UV-resistant thermoplastic material having the following properties
 a surface free energy of less than 35 mJ/m$^2$, and
 an erosion resistance larger than an erosion resistance of the cured resin connecting the turbine blade shells,
wherein the layer of cured epoxy resin covers the cured resin used for connecting the first and second blades shell over at least part of a length of a distal half of the turbine blade, and is bonded to said turbine blade, the method comprising:
 the UV resistant thermoplastic material is heated in a mold until it softens,
 one side of a fabric comprised of bundles of fibers placed on top of one side of the thermoplastic material is immersed in said softened thermoplastic material,
 the thermoplastic material provided with the fabric comprised of bundles of fibers is cooled down;
 a second side of the fabric of the thermoplastic material provided with the fabric comprised of bundles of fibers is immersed in curable resin, and the curable resin is cured to yield a layer of cured epoxy resin,
to yield a shaped cover of composite material, after which curable resin is applied to at least one of i) at least part of the length of the distal half of the turbine blade, and ii) the side of the shaped cover comprising cured epoxy resin;
 the shaped cover is placed over at least part of the length of the distal half of the leading edge of a turbine blade assembly composed of two turbine blade shells connected by cured resin, such that over at least part of the length of the distal half of the turbine blade said cured resin is covered by the shaped cover, and
 the shaped cover is bonded to said turbine blade assembly by curing the curable resin; to yield the protected turbine blade.

6. The method according to claim 5, wherein when curing the curable resin to yield the layer of cured epoxy resin of the shaped cover, at the side of curable resin opposite to the side that is contains immersed bundles of fibers of the fabric a textured peel ply is present to provide a rough surface of increased surface area to increase the bond strength between the shaped cover and the turbine blade.

7. A wind turbine comprising at least one turbine blade comprising a first turbine blade shell and a second turbine blade shell, said first turbine blade shell and said second turbine blade shell being fiber-reinforced turbine blade shells connected by cured resin and provided with a protective cover at a leading edge of the turbine blade for protecting the cured resin at the leading edge of the turbine blade against erosion, wherein the protective cover is a composite comprising a layer of UV-resistant thermoplastic material and a layer of cured epoxy resin, each of the layer of UV-resistant thermoplastic material and the cured epoxy resin forming a connection with fibers of the fiber-reinforced turbine blade shells, the UV-resistant thermoplastic material having the following properties
 a surface free energy of less than 35 mJ/m$^2$, and
 an erosion resistance larger than an erosion resistance of the cured resin connecting the turbine blade shells,
first and second blade shells over at least part of a length of a distal half of the turbine blade, and is bonded to said turbine blade.

8. The wind turbine according to claim 7, wherein the UV-resistant thermoplastic material is UV-stabilized polyolefin.

9. The wind turbine according to claim 8, wherein the polyolefin is ultrahigh molecular weight polyethylene, ultrahigh molecular weight polypropylene or copolymers of polyethylene and polypropylene, or blends comprising polyethylene and polypropylene.

10. The wind turbine according to claim 7, wherein the layer of cured epoxy resin is a layer of fiber-reinforced cured epoxy resin, the fibers being partially embedded in the cured epoxy resin and partially embedded in a remainder of the composite.

* * * * *